United States Patent
Lo et al.

(10) Patent No.: US 9,448,116 B2
(45) Date of Patent: Sep. 20, 2016

(54) FREE SPACE SINGLE-MODE FIBERS AND FIBER COMPONENTS FOR FIBER SENSOR APPLICATIONS

(75) Inventors: Yu-Lung Lo, Tainan (TW); Ren-Young Liu, HsinChu (TW); Chih-Chung Yen, Tainan (TW); Yi-Fan Chung, Taipei (TW)

(73) Assignee: NATIONAL APPLIED RESEARCH LABORATORIES (TW)

( * ) Notice: Subject to any disclaimer, the term of this patent is extended or adjusted under 35 U.S.C. 154(b) by 303 days.

(21) Appl. No.: 13/149,208

(22) Filed: May 31, 2011

(65) Prior Publication Data

US 2012/0182551 A1 Jul. 19, 2012

(30) Foreign Application Priority Data

Jan. 19, 2011 (TW) .............................. 100102012 A (51) Int. Cl.
*G01J 4/00* (2006.01)
*G01J 4/04* (2006.01)
*G02B 6/27* (2006.01)
*G01C 19/72* (2006.01)

(52) U.S. Cl.
CPC .. *G01J 4/00* (2013.01); *G01J 4/04* (2013.01); *G02B 6/2793* (2013.01); *G01C 19/72* (2013.01)

(58) Field of Classification Search
CPC ..................... G01C 19/72–19/728; G01J 4/04
USPC ........................... 356/364, 367–368; 250/225
See application file for complete search history.

(56) References Cited

U.S. PATENT DOCUMENTS

| | | | | |
|---|---|---|---|---|
| 4,342,517 A | * | 8/1982 | Johnson et al. | 356/460 |
| 4,372,685 A | * | 2/1983 | Ulrich | 356/464 |
| 4,389,090 A | * | 6/1983 | LeFevre | 385/11 |
| 4,729,622 A | * | 3/1988 | Pavlath | 385/11 |
| 5,321,501 A | * | 6/1994 | Swanson et al. | 356/479 |
| 6,538,787 B1 | * | 3/2003 | Moeller et al. | 398/158 |
| 2003/0007751 A1 | | 1/2003 | Shinozaki et al. | |
| 2004/0124344 A1 | * | 7/2004 | Rasmussen et al. | 250/225 |
| 2005/0226563 A1 | | 10/2005 | Jin et al. | |
| 2012/0012739 A1 | * | 1/2012 | Koch et al. | 250/227.11 |

FOREIGN PATENT DOCUMENTS

CA 2236521 A1 * 8/1999
GB 2121532 A * 12/1983

OTHER PUBLICATIONS

Iwatsuki, K. "Excess noise reduction in fiber gyroscope using broader spectrum linewidth Er-doped superfluorescent fiber laser." Photonics Technology Letters, IEEE 3.3 (1991): 281-283.*

(Continued)

*Primary Examiner* — Kara E Geisel
*Assistant Examiner* — Rufus Phillips
(74) *Attorney, Agent, or Firm* — Volpe and Koenig, P.C.

(57) ABSTRACT

This invention revealed and demonstrated a method of measuring and deriving a Jones Matrix of a fiber or fiber component, and to compensate the fiber or fiber component such that the fiber or fiber component plus the compensated optical circuit act as if an Unitary Matrix free space condition. In this way, all compensated fibers or fiber components act the same no matter what their original conditions are. It greatly enhances the fiber or fiber component repeatability and stability throughout the fiber or fiber component production line. The compensated circuit for Unitary Matrix can be applied externally or internally.

3 Claims, 8 Drawing Sheets

(56) References Cited

OTHER PUBLICATIONS

Chen et al., "Measurement of linear birefringence and diattenuation properties of optical samples using polarimeter and Stokes parameters," Optics Express (2009) 17(18); 15860-15884.

Pham et al., "Design of Polarization-Insensitive Optical Fiber Probe Based on Effective Optical Parameters," Journal of Lightwave Technology, (2011) 29(8) 1127-1135.

Lo et al., "Characterization on five effective parameters of anisotropic optical material using Stokes parameters-Demonstration by a fiber-type polarimeter," Optics Express (2010) 18(9) 9133-9150.

* cited by examiner

| Circular polarization<br>Ellipticity angles | Right-hand side | Left-hand side |
|---|---|---|
| Input ellipticity angles ($\chi$) | $44.7^0$ | $-45.2^0$ |
| Output ellipticity angles ($\chi$) | $44.5^0$ | $-44.9^0$ |

Fig. 5

| Circular polarization<br>Ellipticity angles | Right-hand side | Left-hand side |
|---|---|---|
| Input ellipticity angles ($\chi$) | $43.7^0$ | $-42.9^0$ |
| Output ellipticity angles ($\chi$) | $42.1^0$ | $-40.6^0$ |

Fig. 6

FREE SPACE SINGLE-MODE FIBERS AND FIBER COMPONENTS FOR FIBER SENSOR APPLICATIONS

FIELD OF THE INVENTION

The invention relates to a compensation method for a fiber or a fiber component. More particularly this invention is to compensate the changes of optical characteristics for the light in a fiber or a fiber component such as a fiber coil of the optical fiber sensor (for example, the fiber optic gyros). The compensation method not only makes the optical characteristics of each fiber or fiber component like as the free space but also greatly accelerate the design simulation for optical circuit optimization of optical fiber sensors.

BACKGROUND OF THE INVENTION

In our daily life, the role of optical fiber technology is getting more and more important. The sensitivity, stability and reproducibility of fiber components are more important when they are applied in the navigation, orientation and platform stability technologies. Because the manufacture process of fiber components (e.g. fiber coil) causes fiber's optical property change and loss, it will make the function of fiber components reduce and degrade.

In the prior art, several different strategies (US 2003/0007751A1 US 2005/0226563A1) are used to solve the problem in optical property change or loss in optical fiber elements. For example, the polarization-maintaining (PM) fiber can be applied to keep the polarization state of light, but the cost of PM fiber is high. Furthermore, the PM fiber ring around the coil is required to maintain the polarization extinction ratio, and this parameter is not easy to maintain. Thus it will increase the cost and difficulty in the manufacture process. Also, the quality of fiber coil is easily affected easily by fiber quality, stress and strain in the winding process, and the rubber filled in the fiber coil. As a result, every fiber coil may produce different levels of optical properties such as linear birefringence (LB), linear diattenuation (LD) and circular birefringence (CB) characteristics or their combination.

For a long time, the high-quality fiber coil winding process in fiber gyroscopes is a high-tech process. It requires not only the combination of special optical fiber and automatic tension control machines, but also the machine under a highly experienced mechanic operation in order to control the quality of fiber coil in an acceptable rage. Thus the high-tech process in fiber coil causes the production costs extremely high. If the quality of fiber coil (from different production dates or different plants) is uncontrollable, the fiber coil winding process needs additional time-consuming tests by re-adjusting fiber coil within the scope of the best quality. If you bypass this adjusting in fiber coil, the poor fiber coils are forced to the lower level in business. Thus the yield of high-quality fiber coil will be substantially reduced.

According to the present invention, applicants have departed from the conventional wisdom, and had conceived and implemented the free space single-mode fibers for fiber sensor, which is relative to that of compensating the fiber or fiber component such that the fiber or fiber component plus the compensated optical circuit act as if an Unitary Matrix free space condition. The disclosed free space single-mode fiber invention not only greatly enhances repeatability in the fiber and fiber component production line, it also can be employed to accelerate the design simulation for optical circuit optimization of optical fiber sensors. Such a fast simulation and the compensated optical circuit nearly acted as if a free space are unprecedented in open literature. The invention is briefly described as follows.

SUMMARY OF THE INVENTION

In the prior act, the equivalent parameters represented the optical circuit can be obtained by the Mueller-Stokes Matrix (Characterization on five effective parameters of anisotropic optical material using Stokes parameters-Demonstration by a fiber-type polarimeter, Optics Express, Vol. 18, Issue 9, . pp. 9133-9150, . April 2010). Please refer to FIG. 1, which shows the experiment environment in the prior art. The polarized light provided by the laser 100 passes through the quarter-wave plate 101 and the polarizer 102 in order to generate four linear polarized lights (0°, 45°, 90° and 135°) and two circuit polarized lights (left spin and right spin), and then the six polarized lights are input into the sample fiber 103. After that, the six polarized lights output from the sample fiber 103 and input the Mueller Stokes Matrix polarimeter 104 for measuring the polarization states of the six polarized light. Then, the five equivalent parameters represented the sample fiber 103, a principal axis angle ($\alpha$), a phase retardation ($\beta$), a diattenuation axis angle ($\theta_d$), a diattenuation (D) and the optical rotation angle ($\gamma$), are obtained by inverting the polarization states of the six polarized light measured from the Mueller Stokes Matrix polarimeter 104. The dynamic range for the five parameters $\alpha$, $\beta$, $\theta_d$, D and $\gamma$ is measured in 0°~180°, 0°~180°, 0°~180°, 0~1 and 0°~180°, respectively.

The Stokes vectors are used to represent the polarization state of the light as follows:

$$S = \begin{bmatrix} S_0 \\ S_1 \\ S_2 \\ S_3 \end{bmatrix} = \begin{bmatrix} I_x + I_y \\ I_x - I_y \\ I_{45°} - I_{-45°} \\ I_{RHC} - I_{LHC} \end{bmatrix} \quad (1.1)$$

where $I_x$ and $I_y$ is the intensity of the horizontal and vertical polarized light, respectively, $I_{45°}$ and $I_{-45°}$ is the intensity of the 45° and −45° polarized light, respectively, $I_{RHC}$ and $I_{LHC}$ is the intensity of the left spin and right spin polarized light, respectively, $S_0$ is the total intensity of the light, $S_1$ is the difference of the intensity of the horizontal and vertical polarized light, $S_2$ is the difference of the intensity of the 45° and −45° polarized light and $S_3$ is the difference of the intensity of the left spin and right spin polarized light. The Mueller Stokes Matrix polarimeter 104 can measure the polarization state of the light, i.e., four Stokes parameters.

Figure 1:
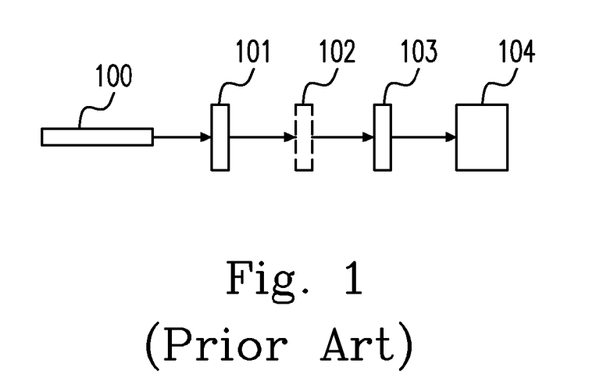
FIG. 1 shows the schematic diagram of simulation architecture of a Mueller Stoke Matrix in the prior art.

The 4×4 Mueller Matrix is used to represent the optical component which changes the polarization state of the light. According to FIG. 1, the polarization state (s) of the outputting light are obtained by multiplying the polarization state ($\hat{s}$) of the inputting light by the matrix of the equivalent optical parameters (M) of the fiber component, as follows:

$$S = \begin{bmatrix} S_0 \\ S_1 \\ S_2 \\ S_3 \end{bmatrix} = \begin{pmatrix} m_{11} & m_{12} & m_{13} & m_{14} \\ m_{21} & m_{22} & m_{23} & m_{24} \\ m_{31} & m_{32} & m_{33} & m_{34} \\ m_{41} & m_{42} & m_{43} & m_{44} \end{pmatrix} \begin{pmatrix} \hat{S}_0 \\ \hat{S}_1 \\ \hat{S}_2 \\ \hat{S}_3 \end{pmatrix} = M\hat{S} \quad (1.2)$$

and the Mueller Matrix M is:

$$M = \begin{pmatrix} m_{11} & m_{12} & m_{13} & m_{14} \\ m_{21} & m_{22} & m_{23} & m_{24} \\ m_{31} & m_{32} & m_{33} & m_{34} \\ m_{41} & m_{42} & m_{43} & m_{44} \end{pmatrix} \quad (1.3)$$

where $m_{ij}$, i, j=1, 2, 3 and 4, . is the equivalent optical parameters of the fiber component.

The Jones Matrix (U) of the optical component is:

$$U = \begin{bmatrix} u_{11} & u_{12} \\ u_{21} & u_{22} \end{bmatrix} \quad (1.4)$$

where $u_{ij}$, i, j=1 and 2 is the equivalent optical parameters of the fiber component.

The Mueller Matrix represented the optical component is obtained via the following transformation formula:

$$M = T(U \otimes U^*) T^{-1} S \quad (1.5)$$

where U is the Jones Matrix, S is the polarization state ($\hat{s}$) of the inputting light, T is a matrix described as follows:

$$T = \begin{pmatrix} 1 & 0 & 0 & 1 \\ 1 & 0 & 0 & -1 \\ 0 & 1 & 1 & 0 \\ 0 & i & -i & 0 \end{pmatrix} \quad (1.6)$$

and the matrix $U \otimes U^*$ is described as follows:

$$U \otimes U^* = \begin{pmatrix} u_{11} u_{11}^* & u_{11} u_{12}^* & u_{12} u_{11}^* & u_{12} u_{12}^* \\ u_{11} u_{21}^* & u_{11} u_{22}^* & u_{12} u_{21}^* & u_{12} u_{22}^* \\ u_{21} u_{11}^* & u_{21} u_{12}^* & u_{22} u_{11}^* & u_{22} u_{12}^* \\ u_{21} u_{21}^* & u_{21} u_{22}^* & u_{22} u_{21}^* & u_{22} u_{22}^* \end{pmatrix} \quad (1.7)$$

In the present invention, the fiber is assumed to have the linear birefringence, linear diattenuation and circular birefringence. Firstly, in the case of the fiber having the linear birefringence of the principal axis angle ($\alpha$) and retardance ($\beta$), whose Jones Matrix $U_b$ is described as follows:

$$U_b = \begin{bmatrix} \cos(\alpha) & -\sin(\alpha) \\ \sin(\alpha) & \cos(\alpha) \end{bmatrix} \begin{bmatrix} \exp\left(-i\frac{\beta}{2}\right) & 0 \\ 0 & \exp\left(i\frac{\beta}{2}\right) \end{bmatrix} \begin{bmatrix} \cos(\alpha) & \sin(\alpha) \\ -\sin(\alpha) & \cos(\alpha) \end{bmatrix} \quad (1.8)$$

$$= \begin{bmatrix} \cos\left(\frac{\beta}{2}\right) - i\cos(2\alpha)\sin\left(\frac{\beta}{2}\right) & -i\sin(2\alpha)\sin\left(\frac{\beta}{2}\right) \\ -i\sin(2\alpha)\sin\left(\frac{\beta}{2}\right) & \cos\left(\frac{\beta}{2}\right) + i\cos(2\alpha)\sin\left(\frac{\beta}{2}\right) \end{bmatrix}$$

So, the Mueller Stokes Matrix of the fiber having the linear birefringence is described as the following equation (1.9):

$$M_{lb} = \begin{pmatrix} 1 & 0 & 0 & 0 \\ 0 & \cos(4\alpha)\sin^2(\beta/2) + \cos^2(\beta/2) & \sin(4\alpha)\sin^2(\beta/2) & \sin(2\alpha)\sin(\beta) \\ 0 & \sin(4\alpha)\sin^2(\beta/2) & -\cos(4\alpha)\sin^2(\beta/2) + \cos^2(\beta/2) & -\cos(2\alpha)\sin(\beta) \\ 0 & -\sin(2\alpha)\sin(\beta) & \cos(2\alpha)\sin(\beta) & \cos(\beta) \end{pmatrix}$$

Secondly, in the case of the fiber having the linear diattenuation of the diattenuation axis angle ($\theta_d$) and the transmission rates u and v, whose Jones Matrix $U_d$ is described as follows:

$$U_d = \begin{bmatrix} \cos(\theta_d) & -\sin(\theta_d) \\ \sin(\theta_d) & \cos(\theta_d) \end{bmatrix} \begin{bmatrix} \sqrt{u} & 0 \\ 0 & \sqrt{v} \end{bmatrix} \begin{bmatrix} \cos(\theta_d) & \sin(\theta_d) \\ -\sin(\theta_d) & \cos(\theta_d) \end{bmatrix} \quad (1.10)$$

$$= \begin{bmatrix} \sqrt{u}\cos^2(\theta_d) + \sqrt{v}\sin^2(\theta_d) & (\sqrt{u} - \sqrt{v})\cos(\theta_d)\sin(\theta_d) \\ (\sqrt{u} - \sqrt{v})\cos(\theta_d)\sin(\theta_d) & \sqrt{u}\sin^2(\theta_d) + \sqrt{v}\cos^2(\theta_d) \end{bmatrix}$$

So, the Mueller Stokes Matrix of the fiber having the linear diattenuation is described as the following equation (1.11):

$$M_{ld} = \begin{pmatrix} \frac{(u+v)}{2} & \frac{\cos(2\theta_d)(u-v)}{2} & \frac{\sin(2\theta_d)(u-v)}{2} & 0 \\ \frac{\cos(2\theta_d)(u-v)}{2} & \frac{(\sqrt{u}+\sqrt{v})^2}{4} + \frac{\cos(4\theta_d)(\sqrt{u}-\sqrt{v})^2}{4} & \frac{\sin(4\theta_d)(\sqrt{u}-\sqrt{v})^2}{4} & 0 \\ \frac{\sin(2\theta_d)(u-v)}{2} & \frac{\sin(4\theta_d)(\sqrt{u}-\sqrt{v})^2}{4} & \frac{(\sqrt{u}+\sqrt{v})^2}{4} - \frac{\cos(4\theta_d)(\sqrt{u}-\sqrt{v})^2}{4} & 0 \\ 0 & 0 & 0 & \sqrt{uv} \end{pmatrix}$$

The diattenuation D is described as follows:

$$D = \frac{u-v}{u+v} \quad (1.12)$$

and $$e = \frac{1-D}{1+D} \quad (1.13)$$

where e is v/u, so that (1.10) and (1.11) are respectively described as the following equations (1.14) and (1.15):

$$U_d = \begin{bmatrix} \cos(\theta_d) & -\sin(\theta_d) \\ \sin(\theta_d) & \cos(\theta_d) \end{bmatrix} \begin{bmatrix} 1 & 0 \\ 0 & \sqrt{\frac{1-D}{1+D}} \end{bmatrix} \begin{bmatrix} \cos(\theta_d) & \sin(\theta_d) \\ -\sin(\theta_d) & \cos(\theta_d) \end{bmatrix} \quad (1.14)$$

$$= \begin{bmatrix} \cos^2(\theta_d) + \sqrt{\frac{1-D}{1+D}}\sin^2(\theta_d) & \left(1-\sqrt{\frac{1-D}{1+D}}\right)\cos(\theta_d)\sin(\theta_d) \\ \left(1-\sqrt{\frac{1-D}{1+D}}\right)\cos(\theta_d)\sin(\theta_d) & \sin^2(\theta_d) + \sqrt{\frac{1-D}{1+D}}\cos^2(\theta_d) \end{bmatrix}$$

and equation (1.15):

$$M_{ld} = \begin{pmatrix} \frac{\left(1+\frac{1-D}{1+D}\right)}{2} & \frac{\cos(2\theta_d)\left(1-\frac{1-D}{1+D}\right)}{2} & \frac{\sin(2\theta_d)\left(1-\frac{1-D}{1+D}\right)}{2} & 0 \\ \frac{\cos(2\theta_d)\left(1-\frac{1-D}{1+D}\right)}{2} & \frac{\left(1+\sqrt{\frac{1-D}{1+D}}\right)^2}{4} + \frac{\cos(4\theta_d)\left(1-\sqrt{\frac{1-D}{1+D}}\right)^2}{4} & \frac{\sin(4\theta_d)\left(1-\sqrt{\frac{1-D}{1+D}}\right)^2}{4} & 0 \\ \frac{\sin(2\theta_d)\left(1-\sqrt{\frac{1-D}{1+D}}\right)}{2} & \frac{\sin(4\theta_d)\left(1-\sqrt{\frac{1-D}{1+D}}\right)^2}{4} & \frac{\left(1+\sqrt{\frac{1-D}{1+D}}\right)^2}{4} - \frac{\cos(4\theta_d)\left(1-\sqrt{\frac{1-D}{1+D}}\right)^2}{4} & 0 \\ 0 & 0 & 0 & \sqrt{\frac{1-D}{1+D}} \end{pmatrix}$$

Finally, in the case of the fiber having the circular birefringence of the optical rotation angle ($\gamma$), whose Jones Matrix $U_{cb}$ is described as follows:

$$U_{cb} = \begin{bmatrix} \cos(\gamma) & \sin(\gamma) \\ -\sin(\gamma) & \cos(\gamma) \end{bmatrix} \quad (1.16)$$

So, the Mueller Stokes Matrix of the fiber having the circular birefringence is described as follows:

$$M_{cb} = \begin{pmatrix} 1 & 0 & 0 & 0 \\ 0 & \cos(2\gamma) & \sin(2\gamma) & 0 \\ 0 & -\sin(2\gamma) & \cos(2\gamma) & 0 \\ 0 & 0 & 0 & 1 \end{pmatrix} \quad (1.17)$$

According to the above description, the equivalent parameters represented the optical circuit of the single-mode fiber and optical fiber component such as the fiber coil can be represented by the Mueller Stokes Matrix via the measurement of the Mueller Stokes Matrix polarimeter.

The present invention is proposed to measure the equivalent optical path of optical components or optical fiber such as fiber coil, and then compensate for it to become a free space unit matrix. So that the stability and reproducibility of optical components or optical fiber such as fiber coil in a fiber gyroscope can be promoted. The theoretical calculation is that Mueller Stokes polarimeter is applied to analyze the results, and then design and calculate the compensation for optical fiber or optical components in order to convert their matrix into the free-space unit matrix.

The fiber sensor provided by the present invention is composed by optically connecting a light source, the optical components, a fiber or fiber component and a light detector. And the polarization state of the light passing through the fiber or fiber components is compensated by a compensation method.

Preferably, the compensation method is performed by adding a variable retarder and a half-wave plate and etc, and a polarization controller can be used to replace the variable retarder and the half-wave plate.

Preferably, no component is added, and the compensation method is realized through fiber bending, twisting or other means at either or both ends of a fiber or fiber component.

According to the method provided by the present invention, the calculated compensation can recover the changes of the optical characteristics of the light passing through the fiber or fiber component caused by the environment and the fabrication process. Compared to the prior art, the invention is performed with adding the optical component or without adding the optical component to remain the polarization state of the inputting light. It also can be employed to greatly accelerate the design simulation for optical circuit optimization of optical fiber sensors due to the compensated optical circuit is a free space unit matrix. As a result, such a fast simulation and the nearly complete recovery of the optical characteristic (excepting the optic power loss) lead to that the optical fiber apparatus made by compensation method can be applied for optical fiber sensors fabricated by fiber and fiber component such as fiber optic gyros, including navigation, orientation, platform stabilization and etc.

In accordance with further aspect of the present invention, an optical system is provided. The optical system includes an optical circuit for propagating a light and an optical compensation assembly placed on the optical circuit to compensate the changes of optical characteristics of the light after the light passing through the optical circuit. The compensation is based on a compensation method of transformation matrix.

In summary, the present invention has disclosed a compensation method to make the equivalent optical circuit of the compensated fiber or fiber component act as if an Unitary Matrix free space condition after measuring the fiber and fiber component. Especially, the results obtained from the Mueller Matrix polarimeter are analyzed theoretically to calculate the compensation when the equivalent Jones Matrix represented the fiber or fiber component such as a fiber coil is transformed to the unit matrix represented the free space. The recovery of optical characteristics is reached by the compensation method via adding optical components or no optical components added. And we further provide an optical verification method to verify the equivalent optical circuit of the compensated fiber or fiber component.

The above aspects and advantages of the present invention will become more readily apparent to those ordinarily skilled in the art after reviewing the following detailed descriptions and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for the purposes of illustration and description only it is not intended to be exhaustive or to be limited to the precise form disclosed.

Figure 2A:
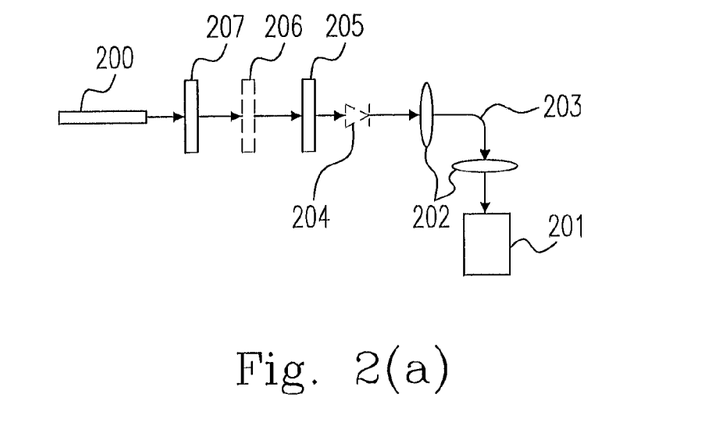
FIG. 2(a) is a first preferred implementation case schematic diagram of the present invention, which is used to verify the accuracy of fiber's five optical parameters.

Please refer to FIG. 2(a), which is the first better implementation example for this case. It is a schematic diagram in compensating for fiber 203. FIG. 2(a) illustrates two fiber coupling devices 202 that is used to connect an optical fiber 203. The polarizer 206 and the quarter-wave plate 207 is used to produce linearly polarization light and neutral density filter 205 and power meter detector 204 is used to ensure that each of the input lights has an identical intensity. Finally, the polarization state of input light can be measured by Stokes polarimeter 201.

Figure 2B:
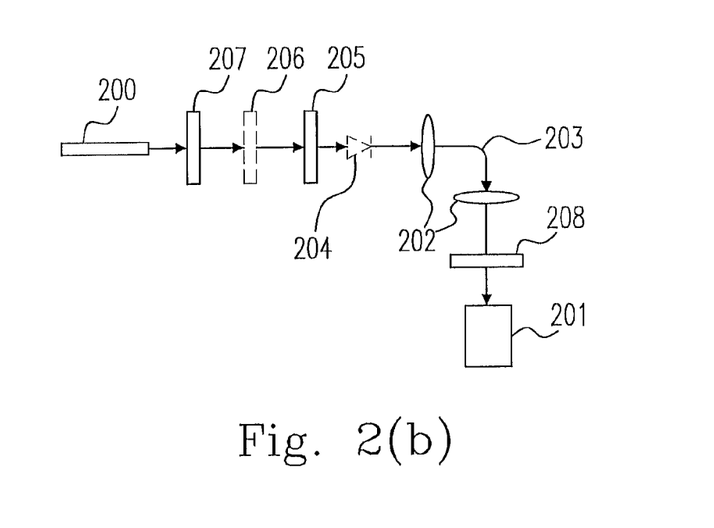
FIG. 2(b) is the implementation of the proposed verification method in the present invention, which is used to verify the accuracy of fiber's five optical parameters.

In order to measure five effective optical parameters in a fiber coil, a 1000 m in length of single mode fiber 203 is used for measurement. FIG. 2(b) illustrates two fiber coupling devices 202 that is used to connect an optical fiber 203. The polarizer 206 and the quarter-wave plate 207 is used to produce linearly polarization light and neutral density filter 205 and power meter detector 204 is used to ensure that each of the input lights has an identical intensity. The single mode fiber 203 is wound on a plastic cylinder which diameter is 15 cm. And the light source 200 is a broadband light source such as ASE (1520 nm~1570 nm) By the different combinations of principal angle of polarizer 206 and quarter-wave plate 207, it can produce four linear polarization lights (0°, 45°, 90°, 135°) and two circular polarization lights (left and right hand). The Stokes polarimeter 201 is applied to measure the Stokes parameters after the different polarization states of light through optical fiber 203, respectively. The following method to compute the single model optical fiber coil's five equivalent parameters is introduced.

The four linear polarization lights: $\hat{S}_{0°}$=[1, 1, 0, 0], $\hat{S}_{45°}$=[1, 0, 1, 0], $\hat{S}_{90°}$=[1, −1, 0, 0] and $\hat{S}_{135°}$=[1, 0, −1, 0] and two circular polarization lights: right handed $\hat{S}_{RHC}$=[1, 0, 0, 1] and left handed $\hat{S}_{LHC}$[1, 0, 0, −1] are going through the sample, respectively. In below equations, $S_0$ is the total light intensity, $S_1$ is the intensity difference between the horizontal and vertical linearly polarized components, $S_2$ is the intensity difference between the linearly polarized components oriented at ±45°, and $S_3$ is the intensity difference between the right- and left-hand circularly polarized components.

As a result, the term $2\alpha+2\gamma$ of the sample can be obtained as $$2\alpha + 2\gamma = \tan^{-1}\left(\frac{-S_{0°}(S_3)}{S_{45°}(S_3)}\right) \quad (2.19)$$

After determining $2\alpha+2\gamma$, the retardance can be obtained as $$\beta = \tan^{-1}\left(\frac{S_{45°}(S_3)}{\cos(2\alpha + 2\gamma) \cdot S_{RH}(S_3)}\right) \quad (2.20)$$

The diattenuation axis $\theta_d$ can be expressed as $$2\theta_d = \tan^{-1}\left(\frac{S_{45°}(S_2) + S_{135°}(S_2)}{S_{0°}(S_1) + S_{90°}(S_1)}\right) \quad (2.21)$$

The Diattenuation D can be expressed as $$D = \frac{S_{45°}(S_2) + S_{135°}(S_2)}{\sin(2\theta_d) \cdot [S_{0°}(S_0) + S_{90°}(S_0)]} \quad (2.22)$$

The principal axis $2\alpha$ can be expressed as $$2\alpha = \tan^{-1}\left(\frac{C_3[S_{RHC}(S_2) - S_{LHC}(S_2)] - C_2[S_{RHC}(S_3) - S_{LHC}(S_3)]}{C_2[S_{RHC}(S_2) - S_{LHC}(S_2)] - C_1[S_{RHC}(S_3) - S_{LHC}(S_3)]}\right)$$

where $$C_1 = \left(\frac{\left(1+\sqrt{\frac{1-D}{1+D}}\right)^2}{4} + \frac{\cos(4\theta_d)\left(1-\sqrt{\frac{1-D}{1+D}}\right)^2}{4}\right)\sin(\beta) \quad (2.24)$$

$$C_2 = \left(\frac{\sin(4\theta_d)\left(1-\sqrt{\frac{1-D}{1+D}}\right)^2}{4}\right)\sin(\beta) \quad (2.25)$$

$$C_3 = \left(\frac{\left(1+\sqrt{\frac{1-D}{1+D}}\right)^2}{4} - \frac{\cos(4\theta_d)\left(1-\sqrt{\frac{1-D}{1+D}}\right)^2}{4}\right)\sin(\beta) \quad (2.26)$$

Then, $2\gamma$ can be obtained as $$2\gamma = \tan^{-1}\left(\frac{-S_{0°}(S_3)}{S_{45°}(S_3)}\right) - 2\alpha \quad (2.27)$$

Then, we can extract five effective optical parameters of $\alpha$, $\beta$, $\theta_d$, D, and $\gamma$ of the SM fiber coil are 71.92°, 144.98°, 96.11°, 0.041°, 23.67, respectively.

Please refer to FIG. 2(b), and this is the proposed verification method of implementation example for this invention. To verify the accuracy of fiber's five optical parameters, we use the extracted five effective optical parameters to measure the known linear birefringence sample. The linear birefringence sample is a quarter-wave plate 208. The known retardance is 90° and slow axis of quarter-wave plate 211 in the back of an optical fiber is rotated in 0°, 30°, 60°, 90°, 120° and 150° for measurement of LB sample in various angles. If the values of five optical parameters in SM fiber are correct, the known principal axes and retardance of quarter-wave plate 208 can be obtained correctly.

Figure 2C:
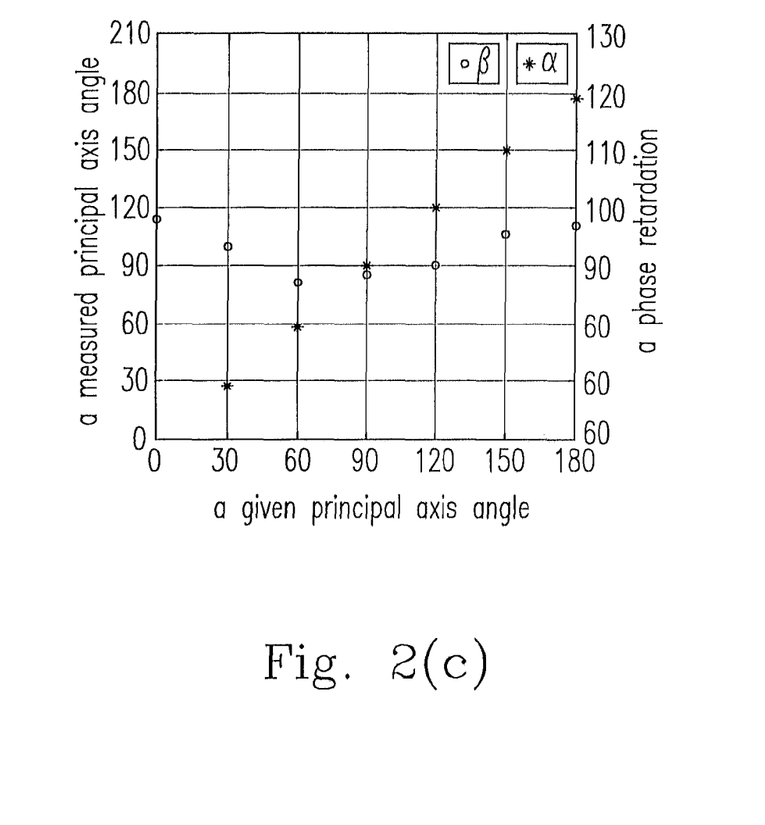
FIG. 2(c) shows the comparison of principal axis angle and retardance between the known optical parameters of a quarter-wave plate and optical parameters extracted by using the proposed verification method.

Please refer to FIG. 2(c), and it shows the comparison of principal axis angle and retardance between the known optical parameters of a quarter-wave plate 211 and optical parameters extracted by using the method above. The experimental results show that the extracted values of the principal axis angle and retardance of the quarter-wave plate have average absolute error of $\alpha_S=1.42°$ and $\beta_S=4.03°$, respectively. From above results, the extracted five effective optical parameters can correctly represent the optical properties of the single-mode fiber coil.

Figure 3A:
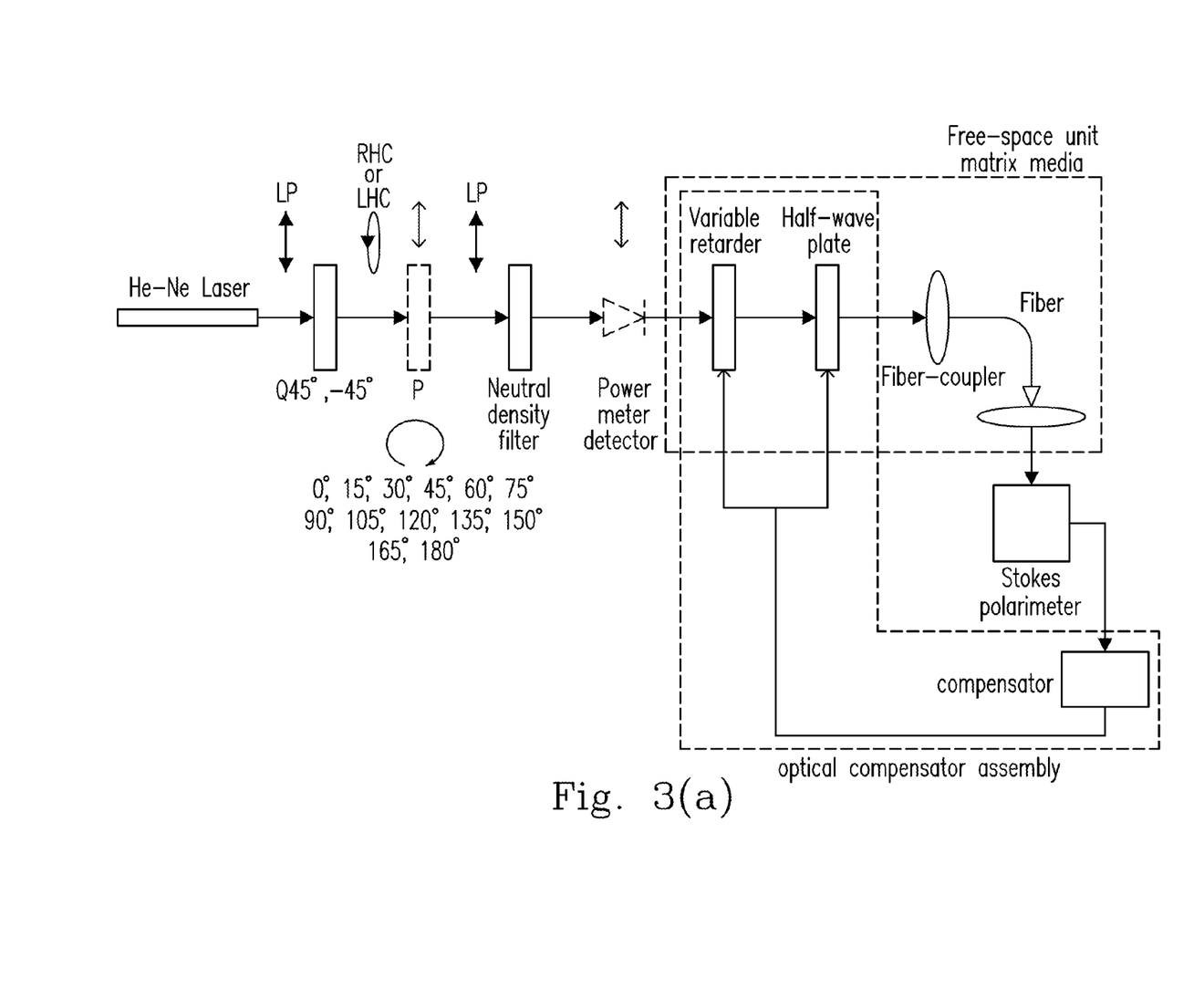
FIG. 3(a) shows the schematic diagram of free-space unit matrix.

Please refer to FIG. 3(a), which shows a variable retarder (VR) and half-wave plate (HP), as part of an optical compensator assembly having a compensator, inserted between the power meter and the fiber coupler used to couple the input polarization light into the optical circuit comprising a fiber, e.g., the fiber sensing element of a fiber optical sensor. The VR compensates for the LB property of the fiber, while the HP compensates for the CB property. Thus, through an appropriate setting of the principal axis angle and retardance of the VR, and the optical rotation of the HP, the fiber can be converted into a free-space medium with negligible linear or circular birefringence, shown in FIG. 3(a) as the free-space unit matrix media. The free-space unit matrix of the VR/HP/fiber configuration shown in FIG. 3(a) can be formulated by the compensator as follows:

$$[M_{Fiber}][M_{HP}][M_{VR}] = \begin{pmatrix} 1 & 0 & 0 & 0 \\ 0 & 1 & 0 & 0 \\ 0 & 0 & 1 & 0 \\ 0 & 0 & 0 & 1 \end{pmatrix} \quad (2.28)$$

Therefore, it follows that $$[M_{HP}][M_{VR}] = [M_{Fiber}]^{-1} \quad (2.29)$$

where $[M_{Fiber}] = [M_{ld}][M_{lb}][M_{cb}] \approx [M_{lb}][M_{cb}]$ since $[M_{ld}] \approx [1]$, and thus $[M_{HP}] \approx [M_{cb}]^{-1}$ and $[M_{VR}] \approx [M_{lb}]^{-1}$. Note that $[M_{HP}]$ is the Mueller matrix of the HP-, and has one variable parameter, $(\gamma_H)$. $[M_{VR}]$ is the Mueller matrix of the VR, and has two variable parameters, $(\alpha_V$ and $\beta_V)$. $[M_{Fiber}]$ is the Mueller matrix of the optical fiber, and has three constant parameters, $(\alpha, \beta$ and $\gamma)$. Generally speaking, the values of $\alpha V$, $\beta V$ and $\gamma_H$ required to compensate for the birefringence properties of the optical fiber are determined via an experimental trial-and-error process. However, this process is tedious and time-consuming. Furthermore, it cannot absolutely guarantee the formation of a free-space condition. Accordingly, a method is proposed for determining the optimal values of $\alpha_V$, $\beta_V$ and $\gamma_H$ for any optical fiber or fiber configuration using a genetic algorithm.

According to this implementation example, if a free-space unit matrix is finally achieved, the input polarization states into the compensation fiber are exactly same as the output polarization states. The light traveling in a free-space fiber is just like light traveling in air. A He—Ne laser (SL 02/2, SIOS Co.) with a central wavelength of 632.8 nm is uesd to produce linear input polarization lights.

Figure 3B:
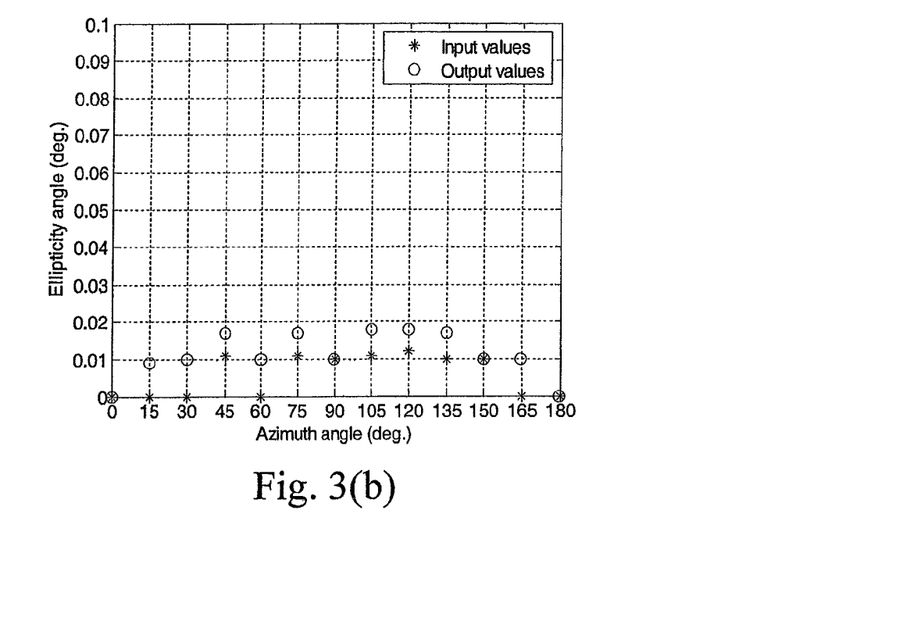
FIG. 3(b) is the comparison of azimuth angles and ellipticity angles of input/output lights given input lights with different linear polarization states.
Figure 5:
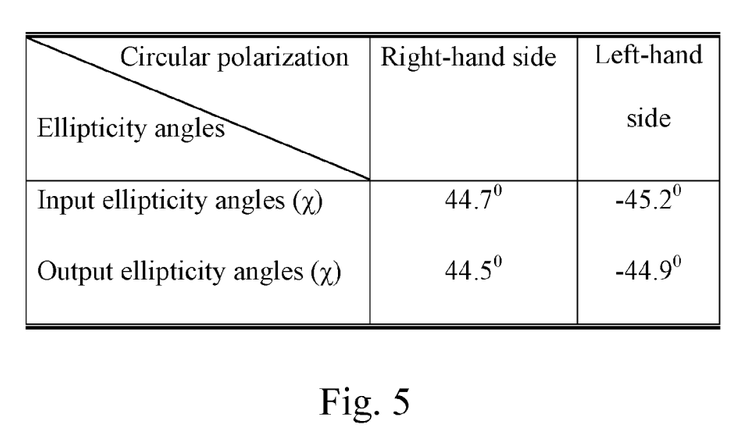
FIG. 5 is the comparison of Ellipticity Angles of Input/Output Lights Given Input Lights with Right- and Left-Hand Circular Polarization States.

Please refer to FIG. 3(b), it is seen that the azimuth angle of the output light is linearly correlated with the azimuth angle of the input light for all linear polarization states. Furthermore, the ellipticity angle of the output light is equal to approximately zero for all angles of the linear polarized light. FIG. 3(b) confirm that the azimuth and ellipticity angles of the light emerging from the VR/HP/fiber structure are virtually identical to those of the light entering the VR. In other words, a free-space condition is successfully achieved when using the optimal VR and HP settings determined by the GA. FIG. 3(b) for linear input polarization lights, a further series of experiments was performed to evaluate its feasibility given right-hand and left-hand circular input polarization lights, respectively. The results presented in FIG. 5 confirm that a good agreement exists between the ellipticity angles of the input and output lights in both polarization states.

Figure 3C:
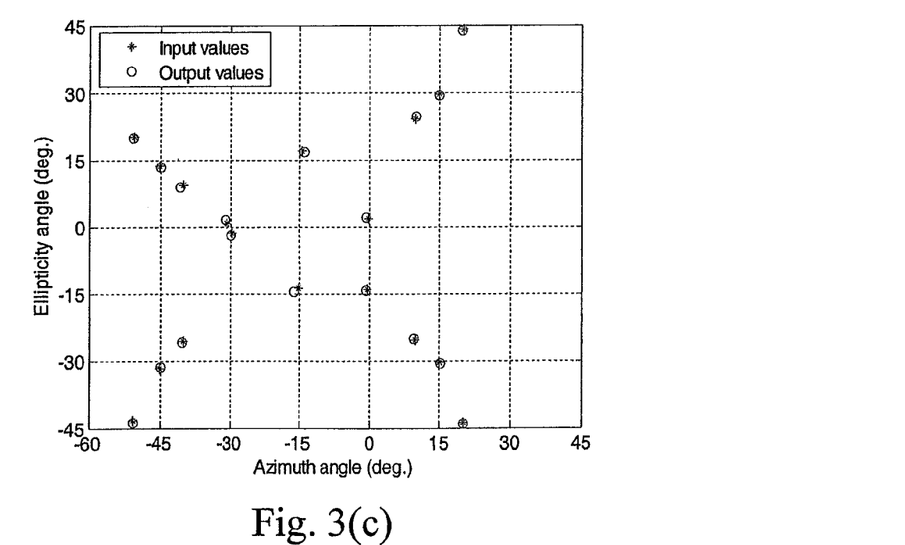
FIG. 3(c) is the comparison of azimuth angles and ellipticity angles of input/output lights given input lights with randomly-chosen right- and left-hand elliptical polarization states.

Please refer to FIG. 3(c), which compares the azimuth/ellipticity angles of the input/output lights in the free-space unit matrix media given input lights with various randomly-selected right- and left-hand elliptical polarization states, respectively. It can be seen that in every case, the azimuth angles and ellipticity angles of the output light are in good agreement with the equivalent angles of the input light. In other words, the ability of the GA to predict the VR and HP settings which result in a free-space condition given a random elliptical polarization state of the input light is confirmed.

Figure 3D:
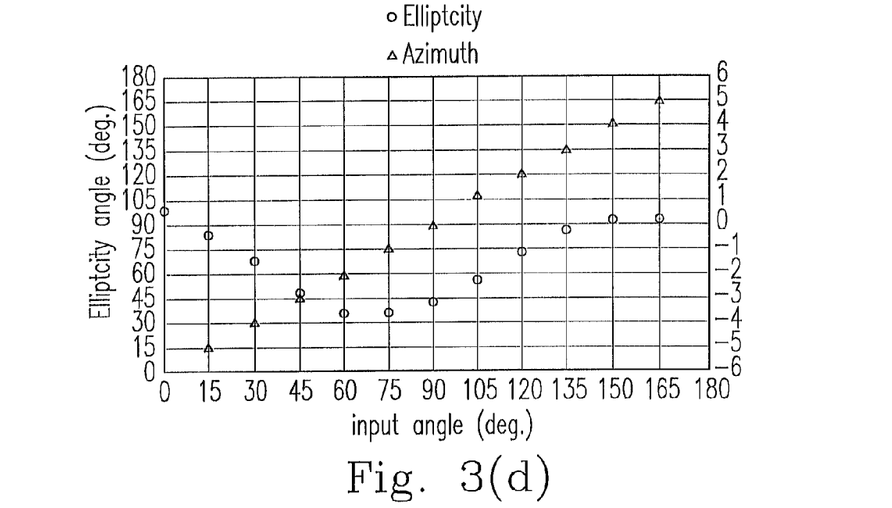
FIG. 3(d) is the comparison of azimuth angles and ellipticity angles of input/output lights given input lights with different linear polarization states using a broadband light source.
Figure 3E:
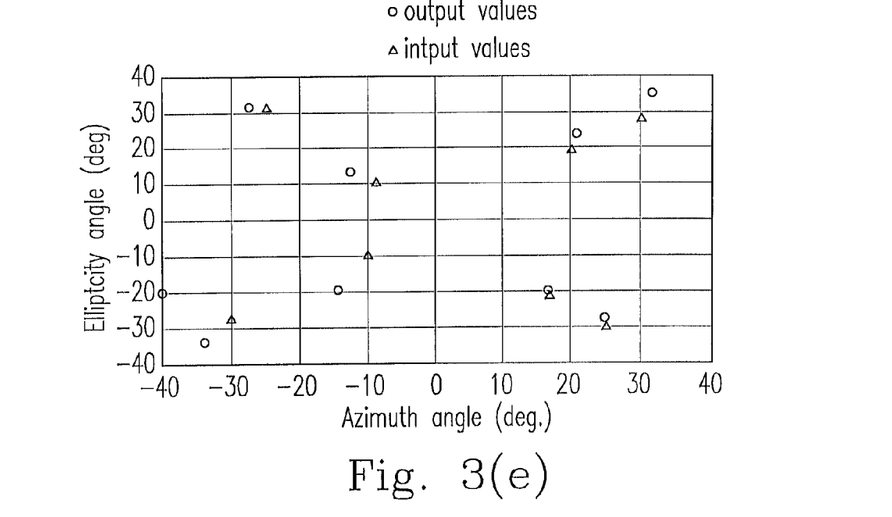
FIG. 3(e) is the comparison of azimuth angles and ellipticity angles of input/output lights given input lights with randomly-chosen right- and left-hand elliptical polarization states using a broadband light source.
Figure 6:
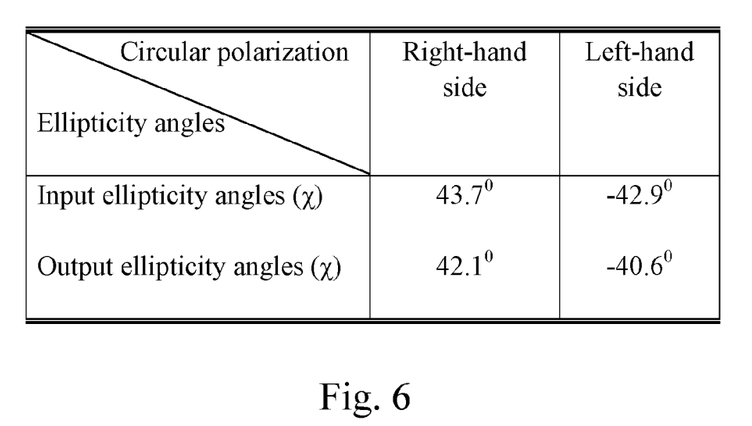
FIG. 6 is the comparison of ellipticity angles of input/output lights given input lights with right- and left- hand circular polarization state using a broadband light source.

Please refer to FIG. 3(d), which verifies a optical compensation of a equivalent free space using a broadband light source such as ASE (1520 nm~1570 nm) FIG. 3(d) shows the linear input polarization lights and the output light. The average compensation error for azimuth angles and ellipticity angles is 0.75° and 1.52°, respectively. A further series of experiments was performed to evaluate its feasibility given right-hand and left-hand circular input polarization lights, respectively. The results are presented in FIG. 6.

Please refer to FIG. 3(*e*), which compares the azimuth/ellipticity angles of the input/output lights in the free-space unit matrix media given input lights with various randomly-selected right- and left-hand elliptical polarization states, respectively. The average compensation error for azimuth angles and ellipticity angles is 2.1° and 4.7°, respectively. Thus, a free-space condition is successfully achieved.

In addition, the first implementation example is included but not limited to the five equivalent optical parameters. Any number of optical parameters sufficient to represent the equivalent of the optical path may also be implemented in the present invention.

Figure 4A:
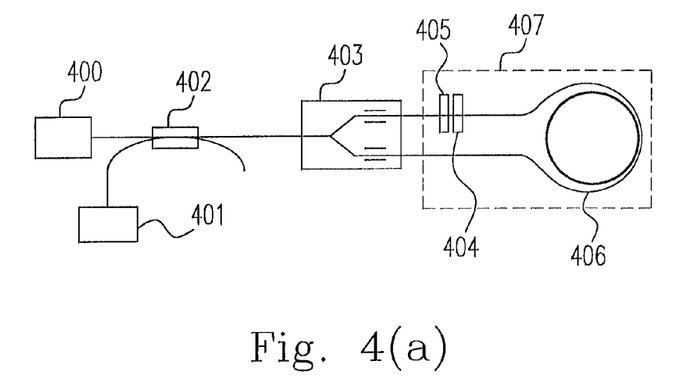
FIGS. 4(a) and (b) are a second and third preferred implementation case schematic diagrams of the present invention, respectively, which show the compensated fiber coils.

Please refer to FIG. 4(*a*), and it is the second better implementation example for this case. It is the schematic diagram in compensating for fiber coil 406 in order to let fiber coil become a free space unit matrix 407 in a fiber optic gyroscope. It contains a light source 400, a detector 401, a fiber coupler 402, IOC 403, and fiber coil 406. At one port of fiber coil, it contains a variable retarder 404 which is used to compensate for the effect of the effective property of LB in an optical fiber coil 406, and a half-wave plate 405 which is used to compensate for the effect of the effective property of CB in an optical fiber 406. A variable retarder 404 and half-wave plate 405 also can be replaced by a polarization controller comprising two quarter waveplates and one half waveplate. And its configuration position is not limited to fiber coil 406 outlet but can be arbitrary allocated to the optical path between IOC 403 and fiber coil 406. All arrangements make the fiber coil become an equivalent free space. According to this implementation example, if a free-space unit matrix is finally achieved, the input polarization states into the compensated fiber coil are exactly same as the output polarization states. The light traveling in the fiber coil is just like the light traveling in air. In addition to the second better implementation example, the optical components used to compensate for the fiber coil 406 are not limited in variable retarder 404 and half-wave plate 405 or polarization controller, and any optical component that can compensate for fiber coil 406 to achieve a free space is included.

Figure 4B:
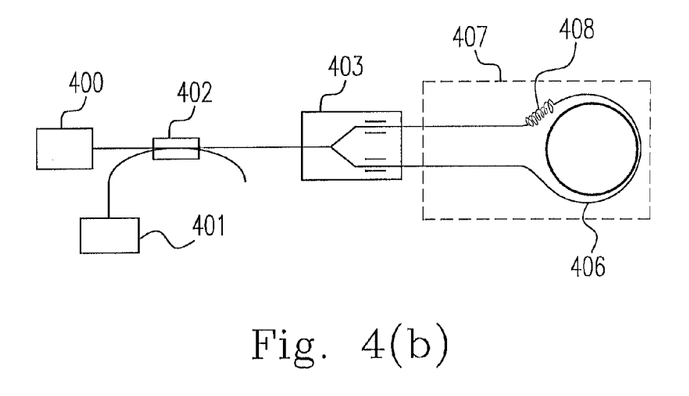

Please refer to FIG. 4(*b*), and it is the third better implementation example for this case. It is the schematic diagram in compensating for fiber coil 406 in order to let fiber coil become a free space unit matrix 407 in a fiber optic gyroscope. It contains a light source 400, a detector 401, a fiber coupler 402, IOC 403, and fiber coil 406. At the end of fiber coil, twisting part of fiber to compensate for fiber coil is used to make the fiber coil to act like the free space 407. The twisted part is not limited to the end of the fiber coil 406 but any optical path between IOC 403 and fiber coil 406 is included. And the method to compensate for fiber coil 406 is not limited in twisting but any method that can make fiber coil 406 become free space 407 is included. According to this implementation example, if a free-space unit matrix is finally achieved, the input polarization states into the compensated fiber coil are exactly same as the output polarization states. The light traveling in the fiber coil is just like the light traveling in air.

In conclusion, by means of the compensation method with or without adding the optical component, the equivalent free space compensation is accomplished by the optical system such as fiber optic gyros provided by the present invention.

Besides, the optical verification method is proposed to verify that the polarization state of the input light remain the same with the output light when the light propagates in the compensated fiber or fiber component, i.e., the equivalent free space. Therefore, the compensation method of the present invention is particularly suitable for the fiber sensors applications, such as fiber gyros, which greatly enhances the fiber or fiber component repeatability and stability throughout the fiber or fiber component production line.

Based on the above descriptions, it is understood that the present invention is indeed an industrially applicable, novel and obvious one with values in industrial development. While the invention has been described in terms of what are presently considered to be the most practical and preferred embodiments, it is to be understood that the invention should not be limited to the disclosed embodiment. On the contrary, it is intended to cover numerous modifications and variations included within the spirit and scope of the appended claims which are to be accorded with the broadest interpretation so as to encompass all such modifications and variations. Therefore, the above description and illustration should not be taken as limiting the scope of the present invention which is defined by the appended claims.

What is claimed is:

1. An optical compensation method comprising the following steps of:

(a) providing an input light having a given polarization state from a broadband laser with a full width at half maximum greater than or equal to 5nm, and a wavelength range being one selected from the group consisting of 1450~1650nm, 1250~1400nm, and 750~900nm to a fiber optical sensor having a fiber sensing element;

(b) obtaining an output light after the input light passes through the fiber sensing element of the fiber optical sensor;

(c) measuring a polarization state of the output light;

(d) obtaining, from the polarization state of the output light and the given polarization state of the input light, a set of equivalent optical parameters representative of the fiber sensing element of the fiber optical sensor, wherein the set of equivalent optical parameters is established by, but not limited to, one of the following three sets of parameters, comprising:

(i) three equivalent optical parameters including a principal axis angle ($\alpha$), a phase retardation ($\beta$) and an optical rotation angle ($\gamma$);

(ii) five equivalent optical parameters including a principal axis angle ($\alpha$), a phase retardation ($\beta$), a diattenuation axis angle ($\theta_d$), a diattenuation (D), and the optical rotation angle ($\gamma$); and (iii) more than five equivalent optical parameters including at least a principal axis angle ($\alpha$), a phase retardation ($\beta$) and an optical rotation angle ($\gamma$);

(e) obtaining solutions of a set of variable parameters by solving an equation that a product of multiplying a compensation matrix comprising the set of variable parameters by an equivalent matrix formed by the set of equivalent optical parameters is equal to a unit matrix; and (f) using the solutions of the set of variable parameters to apply an optical compensation of the polarization state to one of the input light and the output light.

2. The method as claimed in claim 1, wherein the optical compensation is carried out by an optical compensation assembly to make the polarization state of the output light remain the same as that of the input light.

3. The method of claim 1 performed during a production of fiber coil assembly modules, including at least a fiber coil, as part of fiber optic sensor systems.

* * * * *